United States Patent [19]

Houlgrave et al.

[11] 3,827,673

[45] Aug. 6, 1974

[54] VALVE SEAT CONSTRUCTION

[76] Inventors: Robert C. Houlgrave, 2500 Lazy Hollow No. 124C; Joseph P. Weber, 9618 Windswept, both of Houston, Tex. 77042

[22] Filed: Mar. 16, 1973

[21] Appl. No.: 342,223

[52] U.S. Cl. ............................................. 251/360
[51] Int. Cl. ............................................... F16k 3/00
[58] Field of Search ..................... 251/360, 315, 328

[56] References Cited
UNITED STATES PATENTS

| | | | |
|---|---|---|---|
| 2,925,994 | 2/1960 | Downs et al. | 251/360 |
| 2,929,401 | 3/1960 | Cowan | 137/516.29 |
| 2,944,567 | 7/1960 | Jaskarzec | 251/360 X |
| 3,078,865 | 2/1963 | Estes et al. | 251/328 X |
| 3,131,906 | 5/1964 | King | 251/360 |
| 3,746,303 | 7/1973 | Grove et al. | 251/363 X |
| 3,752,178 | 8/1973 | Grove et al. | 251/317 X |

*Primary Examiner*—Henry T. Klinksiek
*Attorney, Agent, or Firm*—Eugene N. Riddle

[57] ABSTRACT

A valve seat construction and method of inserting and securing a sealing member in a so-called dovetailed groove within a seat ring. The sealing member is first positioned beneath one flange overlying the groove and then a second flange is folded over the sealing member to complete the dovetailed groove. The sealing member projects between and beyond the groove and a void space is provided within the groove at least equal to the portion of the sealing member projecting beyond the face of the seat ring. A lubricant groove is positioned adjacent the sealing member to provide a secondary lubricant seal.

2 Claims, 5 Drawing Figures

VALVE SEAT CONSTRUCTION

BACKGROUND OF THE INVENTION

Heretofore, such as shown in U.S. Pat. No. 2,925,994, a retaining lip has been folded over a sealing member of generally rectangular section to hold the sealing member in position within the groove. The single retaining lip employed heretofore has been the only retaining means utilized to hold the rectangular sealing member in position and no lubricant has been employed adjacent the sealing member to aid in sealing against any leakage about the sealing member. Heretofore, for retaining a so-called triangular or delta-shaped seal in place within a groove, a separate retainer ring has been inserted after the seal has been positioned within the groove to hold the sealing member in place.

DESCRIPTION OF THE PRESENT INVENTION

In the present invention an annular seat construction for opposite sides of a valve, such as a gate valve, is provided in which a so-called delta-shaped sealing member is mounted and secured within a groove. During the machining operation the groove for the sealing member is formed with a dovetailed portion of a generally triangular cross section overlying one side of the groove. An extending lip is provided adjacent the other side of the groove and after insertion of the sealing member within the groove beneath the dovetailed portion, the lip is bent over the delta-shaped sealing member to hold the sealing member in place. A lubricant groove is provided adjacent the groove for the sealing member and will provide a secondary lubricant seal to aid in minimizing any leakage past the sealing member. The sealing member projects beyond the adjacent face of the seat ring and when engaged tightly by the adjacent face of the gate will extrude into a void volume of the groove which is at least as great as the projecting portion of the sealing member.

Preferred embodiments of the invention have been chosen for purposes of illustration and description and are shown in the accompanying drawings forming a part of this application in which.

Figure 1:
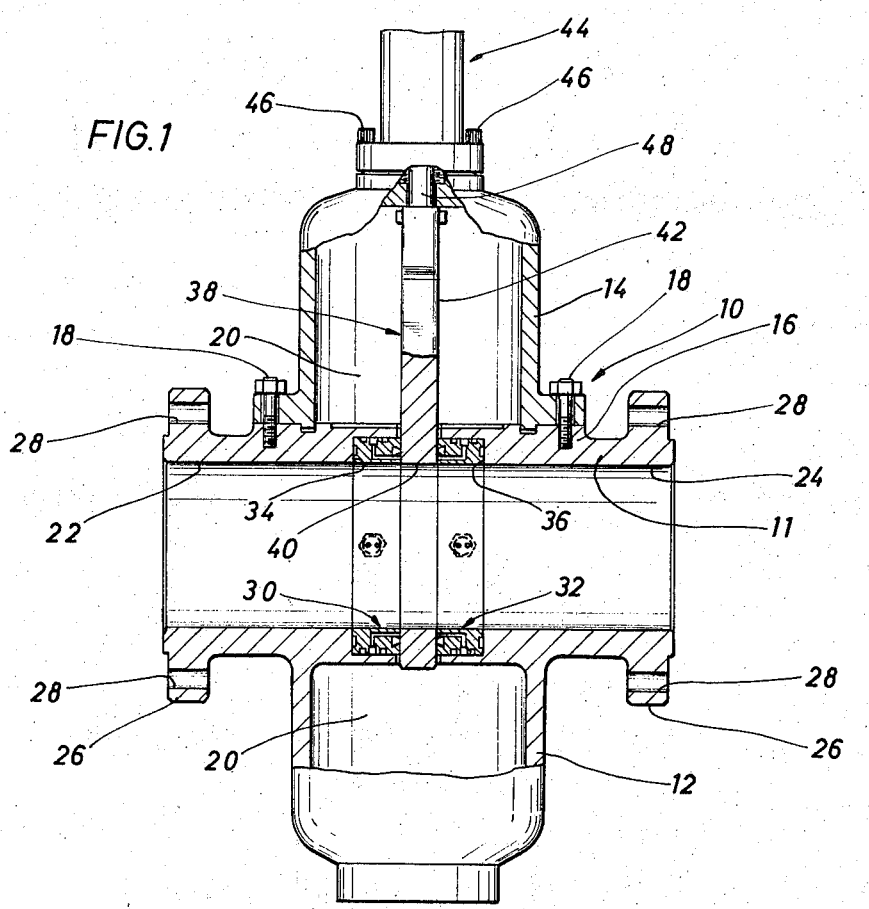
FIG. 1 is a longitudinal section of a gate valve structure embodying the present invention, certain parts thereof being shown in elevation.

Referring now to the drawings for a better understanding of this invention, a through-conduit gate valve structure 10 is illustrated generally in FIG. 1 and comprises a main valve body 11, a lower valve body assembly 12, and an upper bonnet assembly 14. Bonnet assembly 14 is affixed to an upper flange portion 16 of valve body 11 by a plurality of bolts 18 which extend through openings in bonnet assembly 14. Valve body assembly 12 and bonnet assembly 14 cooperate to define a valve chamber 20. The valve body has respective inlet and outlet passages 22 nd 24 which are in fluid communication with valve chamber 20. Suitable flanges 26 are positioned at the ends of main valve body 11 and have suitable openings 28 therein for connection to a pipeline or the like.

A pair of annular seat members indicated generally at 30 and 32 are positioned within respective annular recesses 34 and 36 about flow passages 22 and 24 in opposed facing relation. A gate valve memb generally indicated 38 is mounted for reciprocation between open and closed positions between upstream seat member 30 and downstream seat member 32, and has a port 40 for alignment with flow passages 22, 24 in the open position of gate valve member 38. Gate valve member 38 includes a solid portion 42 which blocks flow passages 22 and 24 in the closed position of the valve to prevent any flow of fluid thereto.

A yoke tube structure indicated generally at 44 is connected to the upper end portion of bonnet assembly 14 by a plurality of bolts 46 to receive a valve stem 48. Valve stem 48 is connected to the upper portion of gate valve member 38 and extends through suitable packing withn yoke tube structure 44 to seal stem 48 for reciprocation between open and closed positions of gate valve member 38. It is understood that a stem operator may be connected to stem 48 for moveyent of gate valve member 38 between open and closed positions.

Figure 2:
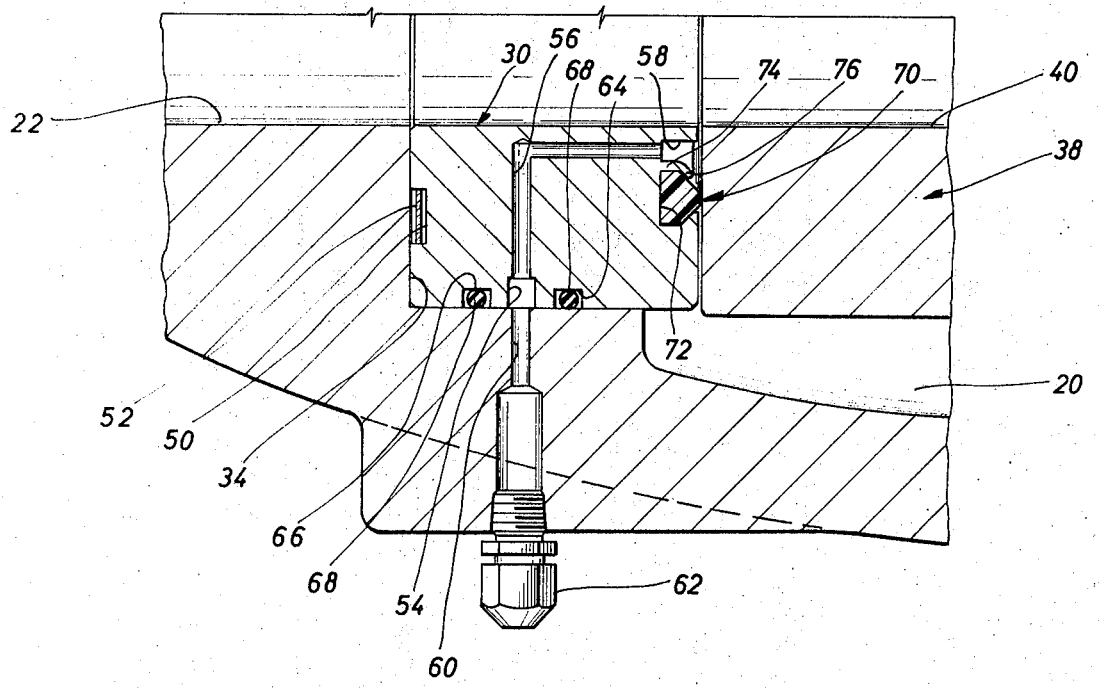
FIG. 2 is an enlarged section illustrating the seat ring structure for the gate valve member.

Referring now particularly to FIG. 2, annular seat member 30 has a rear annular recess 50 which receives a wave spring 52 to urge seat ring 30 toward engagement with gate valve member 38. Annular seat member 30 has an annular lubricant groove 54 extending about its outer circumference and a plurality of lubricant bores 56 extend from lubricant groove 54 to an annular lubricant groove 58 about the face of seat ring 30 and positioned adjacent passageway 22. A lubricant bore 60 extends through the wall of main valve body 11. A suitable lubricant fitting 62 communicates with bore 60 and lubricant is supplied to annular member 30 through lubricant fitting 62. A pair of spaced annular grooves 64, 66 about the outer circumference of seat member 30 on either side of lubricant groove 54 receive O-rings 68 to seal any flow of lubricant from lubricant groove 54. While FIG. 2 only shows upstream seat member 30 in detail, it is to be understood that downstream seat member 32 is identical to seat member 30.

Sealing member 70 is mounted within groove 72 which is concentric to lubricant groove 58. As shown particularly in FIG. 3, a partition 74 separates annular lubricant groove 58 and groove 72, and has an extending free lip portion 76 folded over sealing member 70 to retain member 70 within groove 72. Groove 72 is defined by a planar bottom surface 78, parallel side surfaces 80, 82 extending from lower surface 78, and converging surfaces 84 and 86. Converging surfaces 84 and 86 form flanges overlying groove 72. Surfaces 80 ad 86 are formed by partition 74. Sealing member 70 has a planar lower or inner surface 88, parallel sides 90, and converging upper surfaces 92 which meet at apex 94.

Figure 3:
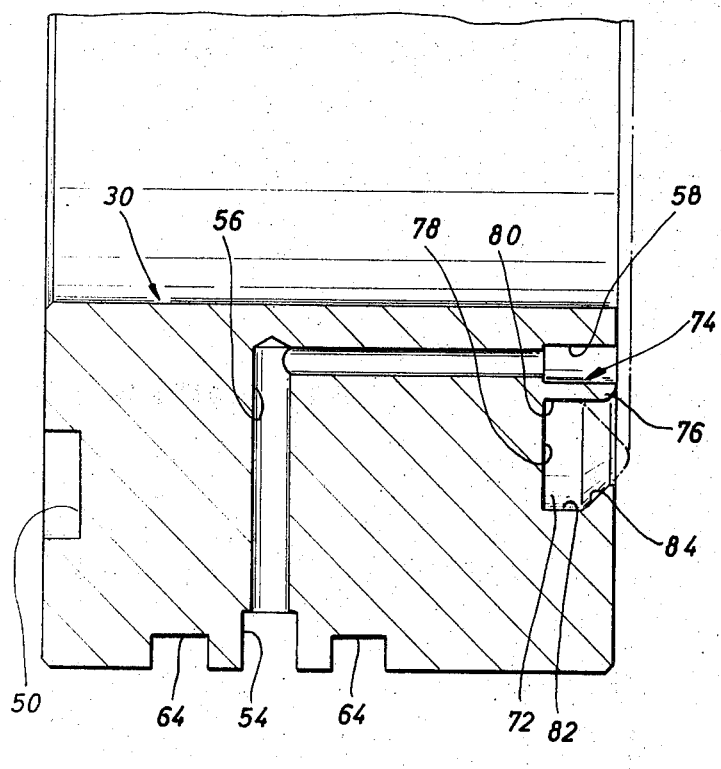
FIG. 3 is an enlarged section similar to FIG. 2 but showing the seat ring removed from the valve body and prior to the insertion of the sealing member therein.
Figure 5:
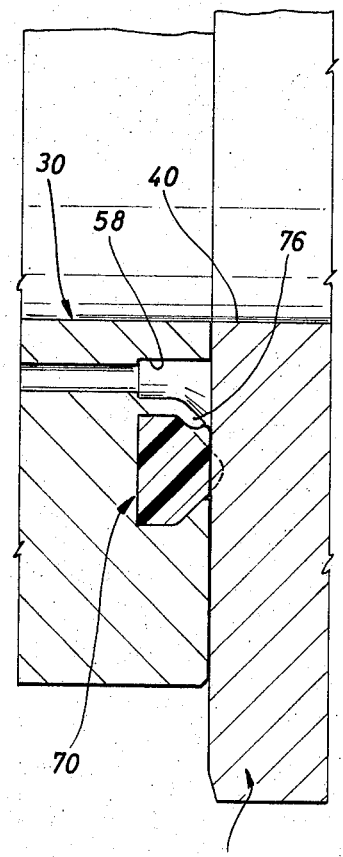
FIG. 5 is a section similar to FIG. 2 but showing the gate valve member engaging the adjacent seat ring and deforming the projecting portion of the sealing member into the void volume of the groove.
Figure 4:
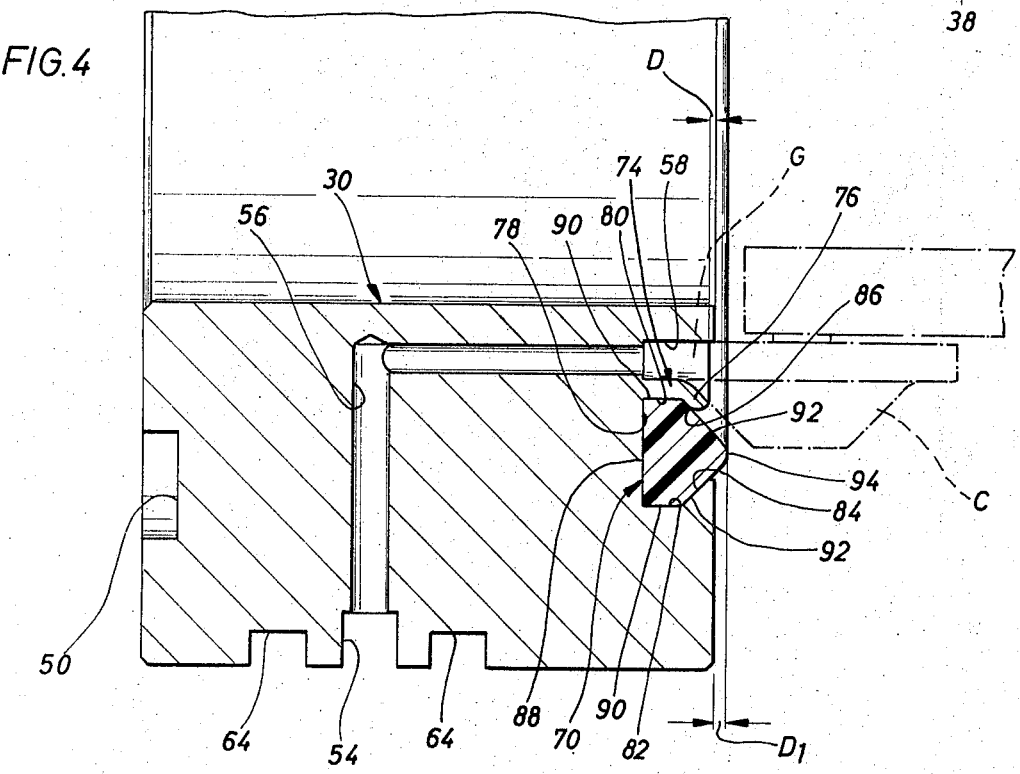
FIG. 4 is a section similar to FIG. 3 but showing the sealing member inserted within the sealing groove and a retainer lip folded over the sealing member to retain the sealing member in the groove.

Referring to FIG. 3 which shows seat member 30 prior to insertion of sealing member 70 within groove 72, partition 74 is in upright or parallel position with respect to groove 72. The surface defining converging surface 84 has been undercut as illustrated in FIG. 3 and sealing member 70 is then inserted within groove 72 with surface 84 initially retaining sealing member 70 in position. As shown in FIG. 4, a suitable cam C having a guide G running within lubricant groove 58 is moved about the circumference of seat member 30 and folds lip 76 over on sealing member 70 to retain sealing member 70 within groove 72. The lip 76 of partition 74 is pressed inwardly of the adjacent face of seat member 30 a distance D as shown on FIG. 4 between around 0.005 to 0.020 inch. The thickness of partition 74 is preferably around 0.050 to 0.125 inch to provide adequate stiffness and yet to be easily folded over on sealing member 70 for retaining sealing member 70 in position. Apex 94 of sealing member 70 projects outwardly from the adjacent face of seating member 30 a distance D1 between around 0.010 and 0.040 inch. The void volume of groove 72 adjacent sealing member 70 and inwardly of the face of sealing member 30 is at least equal to the portion or volume of sealing member 70 which projects beyond the face of sealing member 30. As shown in FIG. 5, gate valve member 38 is in contact with the face of sealing member 30 and sealing member 70 is distorted into the void volume of groove 72 thereby to permit gate member 38 to be in face to face contact with sealing member 30.

From the foregoing, it will be understood that the present invention provides a simple manner of inserting a so-called delta-shaped sealing member within an undercut portion of a groove and retaining the sealing member within the groove by the folding over of a free lip portion. Such a method permits the insertion and retaining of the delta-shaped sealing member without the use of any separate members to retain the sealing member in position. The sealing member is positioned within the groove and retained therein within a minimum of time. While the invention has been illustrated in the drawings as a gate valve, it is to be understood that the present invention could be employed with other types of valves, such as spherical plug valves.

What is claimed is:

1. A valve structure comprising, a valve body having a central valve chamber and an inlet and outlet communicating with the chamber to form a fluid passageway through the valve body, a valve member mounted in said chamber for movement between open and closed positions relative to the passageway, a metallic annular seat ring mounted on opposed sides of the valve chamber and adapted to contact adjacent faces of the valve member, each seat ring having on the side thereof facing the adjacent valve member a pair of contiguous grooves, an annular partition separating the grooves and having a free end portion, and a sealing member in one of the grooves, said sealing member having a planar flat inner surface, a pair of spaced parallel sides extending outwardly from the inner surface, and a pair of converging outer surfaces extending from the parallel sides and terminating at a central apex for contacting the valve member, said one groove being undercut on its side opposite the annular partition to define an overhanging flange in retaining contact with the adjacent converging surface of the sealing member and having additional surfaces complementary to said inner surface and parallel sides of the sealing member, said partition having its free end portion bent in a direction over the sealing member to define an overhanging flange in retaining contact with the adjacent converging surface of the sealing member in the groove but permitting a portion of the sealing member to project from the adjacent face of the associated ring.

2. A valve structure as set forth in claim 1 wherein said free end portion of the partition extends inwardly of the adjacent sealing face of the valve member a distance between around 0.005 inch and 0.020 inch.

* * * * *